United States Patent
Aoyama et al.

(10) Patent No.: US 9,321,121 B2
(45) Date of Patent: Apr. 26, 2016

(54) ELECTRIC RESISTANCE WELDING DEVICE, ELECTRODE THEREFOR, AND WELDING METHOD

(75) Inventors: Yoshitaka Aoyama, Sakai (JP); Shoji Aoyama, Sakai (JP)

(73) Assignee: Yoshitaka Aoyama, Osaka (JP)

( * ) Notice: Subject to any disclaimer, the term of this patent is extended or adjusted under 35 U.S.C. 154(b) by 1054 days.

(21) Appl. No.: 13/389,296

(22) PCT Filed: Jul. 16, 2010

(86) PCT No.: PCT/JP2010/062059
§ 371 (c)(1),
(2), (4) Date: Feb. 7, 2012

(87) PCT Pub. No.: WO2011/021456
PCT Pub. Date: Feb. 24, 2011

(65) Prior Publication Data
US 2012/0132624 A1    May 31, 2012

(30) Foreign Application Priority Data

Aug. 19, 2009 (JP) ................................. 2009-209799
Oct. 30, 2009 (JP) ................................. 2009-265617

(51) Int. Cl.
B23K 11/00    (2006.01)
B23K 11/25    (2006.01)

(52) U.S. Cl.
CPC ........... *B23K 11/0053* (2013.01); *B23K 11/253* (2013.01); *B23K 11/255* (2013.01); *B23K 11/257* (2013.01)

(58) Field of Classification Search
CPC ............. B23K 11/0053; B23K 11/255; B23K 11/253; B23K 11/257

USPC .................................. 219/117.1, 119, 78.01
See application file for complete search history.

(56) References Cited

U.S. PATENT DOCUMENTS

2005/0284847 A1    12/2005    Aoyama et al.
2008/0240895 A1    10/2008    Aoyama et al.

FOREIGN PATENT DOCUMENTS

EP    1 541 273    6/2005
JP    01-249274    10/1989
(Continued)

OTHER PUBLICATIONS

JP 2007118075 machine translation.*
(Continued)

*Primary Examiner* — Jianying Atkisson
(74) *Attorney, Agent, or Firm* — Wenderoth, Lind & Ponack, L.L.P.

(57) ABSTRACT

A device is provided in which a pressing electrode (19, 105) is advanced toward a steel plate component (48, 131) to press a welding projection (4) of a shaft-shaped component (1) against the steel plate component (48, 131), so that the shaft-shaped component (1) is electric-resistance-welded to the steel plate component (48, 131). Pressing force accumulating means (22, 128) for accumulating the pressing force of the pressing electrode (19, 105) is disposed between a pressing member (17, 106) and a pressed member (18, 121). Detection means (54, 113, 3) activated when the pressing member (17, 106) is located at a predetermined position is provided to apply welding current flowing to the electrode, and pressing force adjusting means (55, 123) for adjusting the activation position of the detection means (54, 113, 3) is provided.

14 Claims, 6 Drawing Sheets

(56) References Cited

FOREIGN PATENT DOCUMENTS

| | | |
|---|---|---|
| JP | 08-057659 | 3/1996 |
| JP | 09-285865 | 11/1997 |
| JP | 10-058152 | 3/1998 |
| JP | 2789020 | 8/1998 |
| JP | 2007-118074 | 5/2007 |
| JP | 2007118075 A * | 5/2007 |
| JP | 2007-167947 | 7/2007 |
| JP | 2007-307611 | 11/2007 |
| JP | 2008-272821 | 11/2008 |
| WO | 2004/009280 | 1/2004 |

OTHER PUBLICATIONS

International Preliminary Report on Patentability and Written Opinion of the International Searching Authority issued Mar. 22, 2012 in International (PCT) Application No. PCT/JP2010/062059.
International Search Report issued Oct. 19, 2010 in International (PCT) Application No. PCT/JP2010/062059.

* cited by examiner

ELECTRIC RESISTANCE WELDING DEVICE, ELECTRODE THEREFOR, AND WELDING METHOD

TECHNICAL FIELD

This invention relates to an electric resistance welding device for welding a component, such as a projection bolt, having a welding projection to one side of a steel plate component with the other side being exposed to open space by advancing a pressing electrode toward the steel plate component and pressing the welding projection of the component against only the one side of the steel plate component. The invention also relates to an electrode used in such a device and to a welding method. In the following description, the projection bolt may be referred to simply as a bolt.

BACKGROUND ART

In spot welding, a compression coil spring is disposed between the welding device and a movable electrode operated by the welding device, and two steel plate components sandwiched between the movable electrode and a fixed electrode are welded to each other.

CITATION LIST

Patent Literature

Patent Literature 1: Japanese Patent Application Laid-Open No. H10-058152
Patent Literature 2: Japanese Patent No. 2789020

SUMMARY OF INVENTION

Technical Problem

In the technologies described in the above Patent Literatures, two steel plate components sandwiched between the movable electrode and the fixed electrode are welded to each other. Therefore, the pressing force of the electrodes pressed against the steel plate components can be set to a prescribed value in a reliable manner. However, a particular problem occurs in an electric resistance welding device for welding a component, such as a projection bolt, having a welding projection to one side of a steel plate component with the other side being exposed to open space by advancing a pressing electrode toward the steel plate component and pressing the welding projection of the component against only the one side of the steel plate component.

More specifically, since the other side of the steel plate component is exposed to open space, the steel plate component is elastically deformed when the pressing force of the electrode is applied to the steel plate component. Therefore, it is difficult to maintain the pressing force at a prescribed value. Particularly, in a hand-held welding device, the pressing force is set depending on the force of the operator. Therefore, one problem with such a hand-held welding device is that unusual unevenness in pressing force occurs, and this is likely to cause defective welding, so that a prescribed welding strength is not achieved. This problem is mainly caused because of the following effects. Specifically, one side of the steel plate component is exposed to open space and the amount of heat dissipated from the exposed side is large, so that the shape and size of the welded portion are not in appropriate conditions.

A more important fact is that, when a steel plate component with a different thickness or a component having a welding projection with different size and shape is used, the welding pressing force of the welding projection against the steel plate component changes. A stable welded portion cannot be ensured unless a welding device that can quickly cope with such changes is used.

The present invention has been made to solve the foregoing problems, and it is an object of the invention to provide an electric resistance welding device for welding a component to one side of a steel plate component with its opposite side being exposed to open space, wherein a welding current is applied when the welding pressing force of a welding projection against the steel plate component becomes appropriate, and the welding device can be configured to have a compact general configuration.

One task necessary to embody the above-described action of the electric resistance welding device as an action of an electrode is that "a welding current is applied in a reliable manner when the welding pressing force of the welding projection against the steel plate component becomes appropriate," as in the case of the electric resistance welding device.

More specifically, in the electric resistance welding device and also in the electrode, it is important to apply the welding current automatically when the pressing force of the welding projection against the steel plate component reaches a prescribed value. When this is satisfied, uniform and favorable welding quality is always ensured.

In an electrode described in Japanese Patent No. 2789020, a shaft-shaped component including a shaft section, a flange formed integrally with the shaft section, and a welding projection formed on a flange surface opposite to the shaft section is used for electric resistance welding. A guide tube made of an insulating material is inserted into a substantially cylindrical electrode main body, and a receiving hole having an opening at the end surface of the electrode is formed inside the guide tube so as to pass therethrough. A stopper member that receives the shaft section inserted into the receiving hole is disposed inside the guide tube in an advanceable and retractable manner, and a coil spring for urging the stopper member toward the end surface of the electrode is disposed inside the electrode main body. A prescribed gap is formed between the flange of the shaft-shaped component inserted into the receiving hole and the end surface of the electrode. When the electrode is advanced and the welding projection is pressed against a welding object member, the end surface of the electrode comes into contact with the flange against the urging force of the coil spring.

The contact established between the end surface of the electrode and the flange allows a detection current indicating that the shaft-shaped component is in position to flow.

In the above Patent Literature, there is a description about the detection of the presence or absence of the shaft-like member. However, there is no description that the welding current is applied at appropriate timing, i.e., when the electrode is advanced to a predetermined position and the welding pressing force reaches a predetermined value. Generally, the welding current is applied in response to a trigger signal generated when a unit for supplying a component such as a projection bolt to the electrode moves back a predetermined distance. With such a method, a sensor for generating the trigger signal must be additionally provided in a part of the component supply unit. One problem with such a sensor is that the timing at which the welding current is applied cannot be maintained constant if the attachment position of the sensor is displaced or the returning speed of the component supply unit is changed.

In addition, since the pressing force of the welding projection against the welding object member is not maintained constant, the amount of molten metal is not constant, so that variations in welded state occur. Particularly, since a portable electric resistance welding device is operated with the operator holding it with the hands, it is difficult to set the pressing force of the welding projection against the welding object member to a predetermined value. More specifically, since the pressing force varies depending on the force applied by the operator, variations in welded state occur, and this is not preferred in terms of the maintenance of the quality of welding. In addition, when the welding device is of the above-described hand-held type, the shaft-shaped component is sometimes not easily welded perpendicular to the welding object member.

The present invention is provided to solve the above problems, and it is an object to provide an electric resistance welding electrode that has a simple structure allowing the timing at which a welding current is applied to be correctly maintained and allows a welding pressing force to be always maintained at a constant value. It is another object to provide a welding method.

Solution to Problem

A first aspect of the present invention provides an electric resistance welding device that uses, as an object component to be electric-resistance-welded to a steel plate component, a shaft-shaped component including a shaft section, a flange formed integrally with the shaft section, and a welding projection formed on a flange surface opposite to the shaft section, the shaft section being inserted into a receiving hole formed in a pressing electrode for electric resistance welding, a welding current being allowed to flow from the shaft-shaped component to the steel plate component with the pressing electrode being advanced and the welding projection being pressed against the steel plate component, the electric resistance welding device being characterized in that pressing force accumulating means for accumulating pressing force of the welding projection against the steel plate component by the pressing displacement of the pressing member is disposed between a pressing member to which the pressing displacement is transmitted and a pressed member that transmits the pressing force to the shaft-shaped component in the receiving hole, and that detecting means is provided, the detecting means being activated when an amount of the pressing displacement of the pressing force accumulating means reaches a predetermined value and the pressing force of the welding projection against the steel plate component is set to a predetermined value, the welding current being applied in response to a detection signal from the detecting means.

As the pressing electrode is advanced, the displacement of the pressing member is applied to the pressing force accumulating means. When the amount of pressing displacement of the pressing force accumulating means reaches a predetermined value, the pressing force of the welding projection against the steel plate component is set to a predetermined value. At this timing, the detecting means is activated and issues the detection signal to apply the welding current, and the welding is completed.

As described above, the welding current is applied in response to the detection signal at the same time as the amount of pressing displacement of the pressing force accumulating means reaches a predetermined value and the pressing force is set appropriately. Therefore, the amount of molten metal in the welded portion is appropriately maintained, and favorable welding quality can be ensured.

A second aspect of the invention is the electric resistance welding device according to the first aspect, wherein the steel plate component has one side to which the shaft-shaped component is to be welded and the other side opposite to the one side being supported with the other side being exposed to open space, and the pressing electrode is advanced toward the steel plate component to press the welding projection of the shaft-shaped component against only the one side of the steel plate component, welding pressing force of the welding projection against the steel plate component is set to be the sum of the pressing force accumulated in the pressing force accumulating means and the elastic restoring force of the steel plate component elastically deformed by the advance of the pressing electrode, and the detecting means is sensor means that is activated when the pressing member is displaced to a predetermined position to apply the welding current flowing to the pressing electrode, and pressing force adjusting means is provided, the pressing force adjusting means being used to set an activation position of the sensor means so that the welding current flowing to the pressing electrode is applied when the welding pressing force becomes an appropriate value.

The welding pressing force of the welding projection against the steel plate component when the pressing member is displaced to a predetermined position is given as the sum of the pressing force accumulated in the pressing force accumulating means and the elastic restoring force of the steel plate component elastically deformed by the advance of the pressing electrode, and the welding current is applied when the sum reaches a predetermined value. More specifically, an appropriate welding pressing force is set according to the predetermined displacement amount of the pressing member, and the welding current must be applied when the appropriate welding pressing force is reached. Current application timing suitable for the predetermined welding pressing force is set by the pressing force adjusting means using its function of adjusting the activation position of the sensor means. Therefore, the welding current is applied under appropriate welding pressing force conditions, and a favorable welded portion can be ensured.

The elastic restoring force of a steel plate component may change depending on its thickness, and the heat capacity of the welding projection of a component may change depending on the size and shape of the welding projection. In such cases, the welding pressing force of the welding projection against the steel plate component must be set to a suitable value according to such changes, and the welding current must be applied when the set value is reached. The function of adjusting the activation position of the sensor means that is performed by the pressing force adjusting means is used to cope with the changes. For example, when a steel plate component having a large thickness is used and the welding projection of a projection nut is used instead of the welding projection of a projection bolt, the activation position of the sensor means is adjusted, so that the welding current is applied when an appropriate welding pressing force is reached. In this manner, regular welded portions can be always ensured even when various changes such as described above are faced.

Particularly, for a hand-held welding device in which the welding pressing force is set depending on the force of the operator, the adjustment according to various changes can avoid the occurrence of unusual unevenness in welding pressing force, and the occurrence of defective welding can thereby be prevented.

A third aspect of the invention is the electric resistance welding device according to the first aspect, wherein guide means for allowing the pressing member and the pressed member to be displaced relative to each other along an axis of the electrode is disposed between the pressing member and the pressed member, and the guide means is attached to a support member disposed in parallel to the direction of the axis of the pressing electrode.

With this configuration, the pressing member and the pressed member are displaced relative to each other in a direction along the direction of the axis of the pressing electrode, and therefore the displacement movement of the pressing member and the pressed member is performed smoothly and accurately.

A deflectable conductive member for supplying the welding current to the pressing electrode is disposed on the side opposite to the guide means with respect to the axis of the pressing electrode.

In this configuration, the conductive member and the guide means can be disposed on the opposite sides of the axis of the pressing electrode, and therefore the device can be made compact as a whole.

In this configuration, two pressing force accumulating means may be disposed in parallel to each other, and the axis of the pressing electrode passes between the two pressing force accumulating means.

The two pressing force accumulating means disposed in this configuration can improve the support stability of the pressing member and the pressed member. Since the axis of the pressing electrode passes between the two pressing force accumulating means, the structural compactness in the vicinity of the pressing force accumulating means is improved.

A fourth aspect of the invention is the electric resistance welding device according to any of the first to third aspects, wherein the pressing force accumulating means comprises a compression coil spring.

With this configuration, the pressing force is accumulated in a reliable manner, and the structure is simplified.

A fifth aspect of the invention is the electric resistance welding device according to any of the first to third aspects, wherein the pressing force accumulating means comprises a fluid-type pressure accumulation unit.

With this configuration, the pressing force is accumulated in a reliable manner, and the structure is simplified.

The invention described above is a device invention. However, as is clear from embodiments described later, the invention can be embodied as a method invention in which the process of pressing the welding projection, the process of the action of the elastic restoring force of the steel plate component, etc. are specified.

A sixth aspect of the invention provides an electrode used in an electric resistance welding device that uses, as an object component to be electric-resistance-welded to a steel plate component, a shaft-shaped component including a shaft section, a flange formed integrally with the shaft section, and a welding projection formed on a flange surface opposite to the shaft section, the shaft section being inserted into a receiving hole formed in a pressing electrode for electric resistance welding, a welding current being allowed to flow from the shaft-shaped component to the steel plate component with the pressing electrode being advanced and the welding projection being pressed against the steel plate component, the electrode being characterized in that
pressing force accumulating means for accumulating pressing force of the welding projection against the steel plate component by pressing displacement of the pressing member is disposed between a pressing member to which the pressing displacement is transmitted and a pressed member that transmits the pressing force to the shaft-shaped component in the receiving hole, and that detecting means is provided, the detecting means being activated when the amount of pressing displacement of the pressing force accumulating means reaches a predetermined value and the pressing force of the welding projection against the steel plate component is set to a predetermined value, the welding current being applied in response to a detection signal from the detecting means.

The operational effects of the electrode used in the electric resistance welding device are the same as those described for the first aspect.

A seventh aspect of the present invention is the electrode for an electric resistance welding device according to the sixth aspect, wherein: the pressing member is a metal-made substantially cylindrical electrode main body into which a guide tube made of an insulating material is inserted; the receiving hole has an opening on an end face of the electrode and is formed so as to be in communication with the guide tube, and an insulating structure is formed on the inner surface of the receiving hole; a stopper member that receives the shaft section inserted into the receiving hole is disposed in the guide tube so as to be advanceable and retractable, the stopper member corresponding to the pressed member; urging means for urging the stopper member toward the end face of the electrode is disposed in the electrode main body, the urging means corresponding to the pressing force accumulating means; a predetermined gap is formed between the flange of the shaft-shaped component inserted into the receiving hole and the end face of the electrode; when the pressing electrode is advanced to press the welding projection against the steel plate component, the end face of the electrode comes into contact with the flange against the urging force of the urging means; and an energization signal obtained by the contact corresponds to the detection signal, and the detection signal is used as a trigger signal for applying the welding current flowing between the welding projection and the steel plate component.

Since the insulating structure is formed on the inner surface of the receiving hole and the stopper member is inserted into the guide tube made of an insulating material, the shaft section of the shaft-shaped component does not come into contact with any portion of the metal-made electrode main body. Therefore, when the pressing electrode is advanced and the welding projection is pressed against the steel plate component, the end face of the electrode comes into contact with the flange against the urging force of the urging means. The energization signal current thereby flows between the end face of the electrode and the flange, and the welding current is applied in response to the energization signal current used as the trigger signal. The welding is thereby completed.

Therefore, the trigger signal can be ensured by the intimate contact between the end face of the electrode and the flange without using any special signal generating means, and the pressing electrode obtained can have a simplified structure. The timing of the application of the welding current is set to the timing at which the end face of the electrode comes into press contact with the flange, and the application timing is always maintained constant, with the welding projection being appropriately pressed against the welding object member. A uniform welding state is thereby formed, and favorable welding quality can be ensured.

In other words, the above-described switch-like function for the end face of the electrode and the flange is implemented by "the configuration including the detection means activated when the amount of pressing displacement of the pressing force accumulating means reaches a predetermined value and the pressing force of the welding projection against the steel plate component is set to a predetermined value, so that the welding current is applied in response to a detection signal from the detecting means."

An eighth aspect of the invention is the electrode for an electric resistance welding device according to the seventh aspect, wherein the value of the length of the predetermined gap is set so that the predetermined value of the pressing force of the welding projection against the steel plate component can be set to a value that corresponds to the compression reaction force of the urging means when the end face of the electrode comes into contact with the flange.

When the predetermined gap, i.e., the distance between the end face of the electrode and the flange, disappears, the amount of compression of the urging means is constant, and therefore the compression reaction force of the urging means is always constant. Therefore, the pressing force of the welding projection against the welding object member is a constant load, and the amount of molten metal is constant, so that favorable welding quality can be ensured.

Particularly, in a portable electric resistance welding device, since the operator holds the device with the hands during operation, it is difficult to set the pressing force of the welding projection against the welding object member to a predetermined value. More specifically, since the pressing force varies depending on the operation by the operator, the welded state is not steady, and this is not preferable in terms of the maintenance of welding quality. However, in the present invention, since a constant pressing force is always applied as described above, the problem of the welding quality is eliminated. In addition, even in the above-described hand-held type device, welding is preformed with the end face of the electrode being in intimate contact with the flange. Therefore, the shaft-shaped component can be welded perpendicularly to the welding object member by aligning the axis of the electrode perpendicular to the welding object member.

A ninth aspect of the present invention is the electrode for the electric resistance welding device according to the seventh or eighth aspect, wherein insertion of the shaft-shaped component into the receiving hole is detected using the energization signal obtained by the contact.

With this configuration, if, for some reason, the shaft-shaped component is not held by the electrode, the absence of the shaft-shaped component can be detected before the welding current is applied, and problems caused by a defective product in the subsequent process can be prevented.

The invention described above relates to an electrode. However, as is clear from embodiments described later, the invention can be embodied as a portable electric resistance welding device.

A tenth aspect of the present invention provides a welding method for electric resistance welding that uses, as an object component for electric resistance welding, a shaft-shaped component including a shaft section, a flange formed integrally with the shaft section, and a welding projection formed on a flange surface opposite to the shaft section, the method comprising: preparing a pressing electrode, the pressing electrode having formed therein a receiving hole having an opening on an end face of the electrode, the shaft section being inserted into the receiving hole, a predetermined gap being formed between the end face of the electrode and the flange of the shaft-shaped component inserted into the receiving hole; advancing the pressing electrode and pressing the welding projection against a steel plate component used as a welding object member to bring the end face of the electrode into contact with the flange; and applying welding current flowing between the welding projection and the steel plate component using an energization signal obtained by the contact as a trigger signal.

As described above, the welding current is applied when the end face of the electrode simply comes into contact with the flange. Therefore, the trigger signal can be ensured by the intimate contact between the end face of the electrode and the flange without using any special signal generating means, and the timing of the application of the welding current can be maintained constant. More specifically, the timing of the application of the welding current is set to the timing at which the end face of the electrode comes into press contact with the flange, and the timing of the application of the current is always maintained constant, with the welding projection being appropriately pressed against the welding object member. A uniform welding state is thereby formed, and favorable welding quality can be ensured.

DESCRIPTION OF EMBODIMENTS

Embodiments of an electric resistance welding device of the present invention, an electrode therefor, and a welding method will next be described.

First, the electric resistance welding device will be described.

[Embodiment 1]

FIGS. 1A, 1B, 2, 3A, 3B, and 4 show Embodiment 1 of the present invention.

In the present invention, various components may be used as an object component. However, the component used in the present embodiment is a projection bolt.

First, the projection bolt will be described.

Figure 1A:
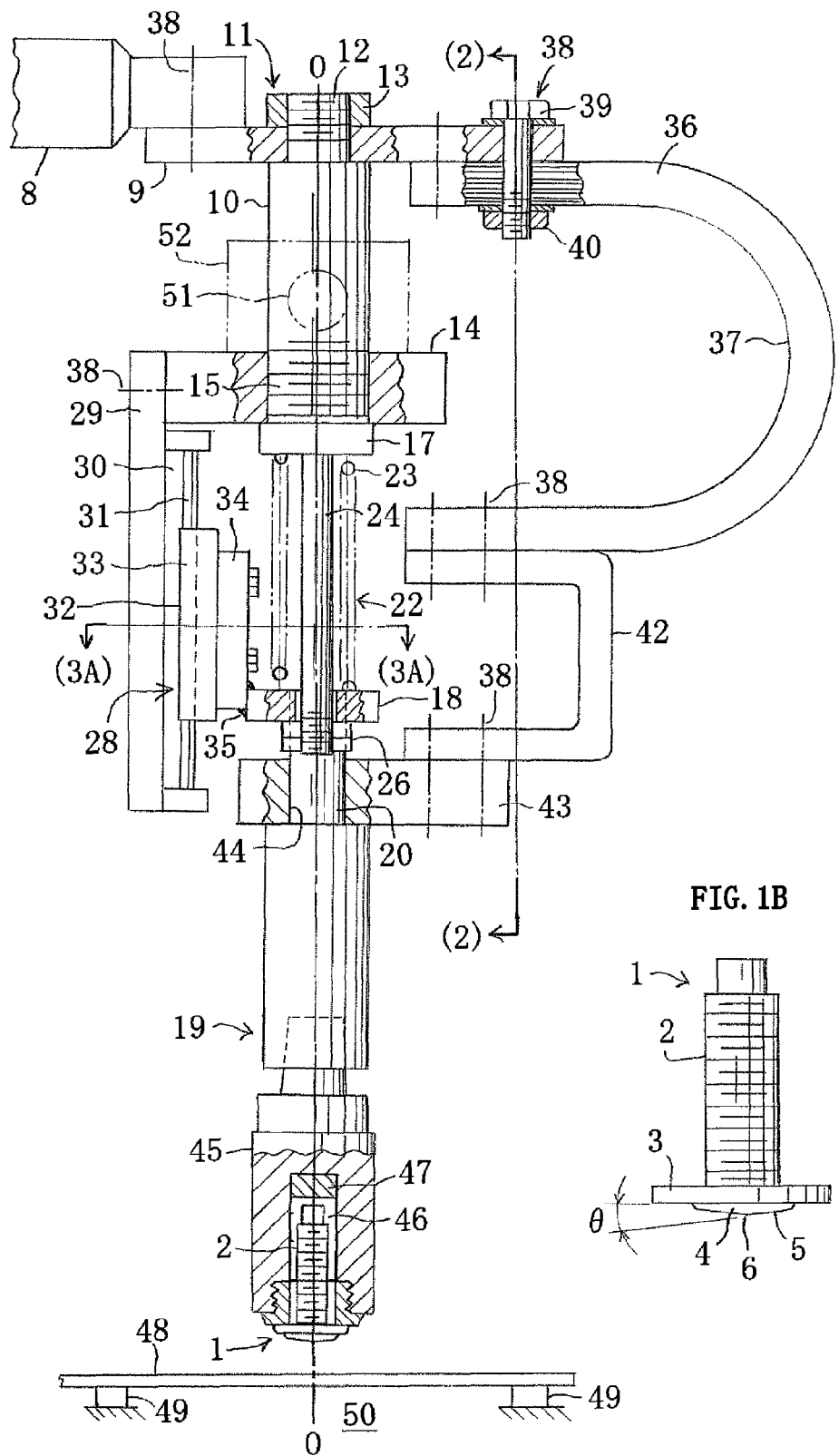
FIG. 1A is a side view illustrating an entire electric resistance welding device.
Figure 1B:
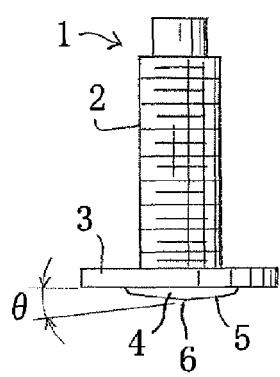
FIG. 1B is a side view of a projection bolt.
Figure 2:
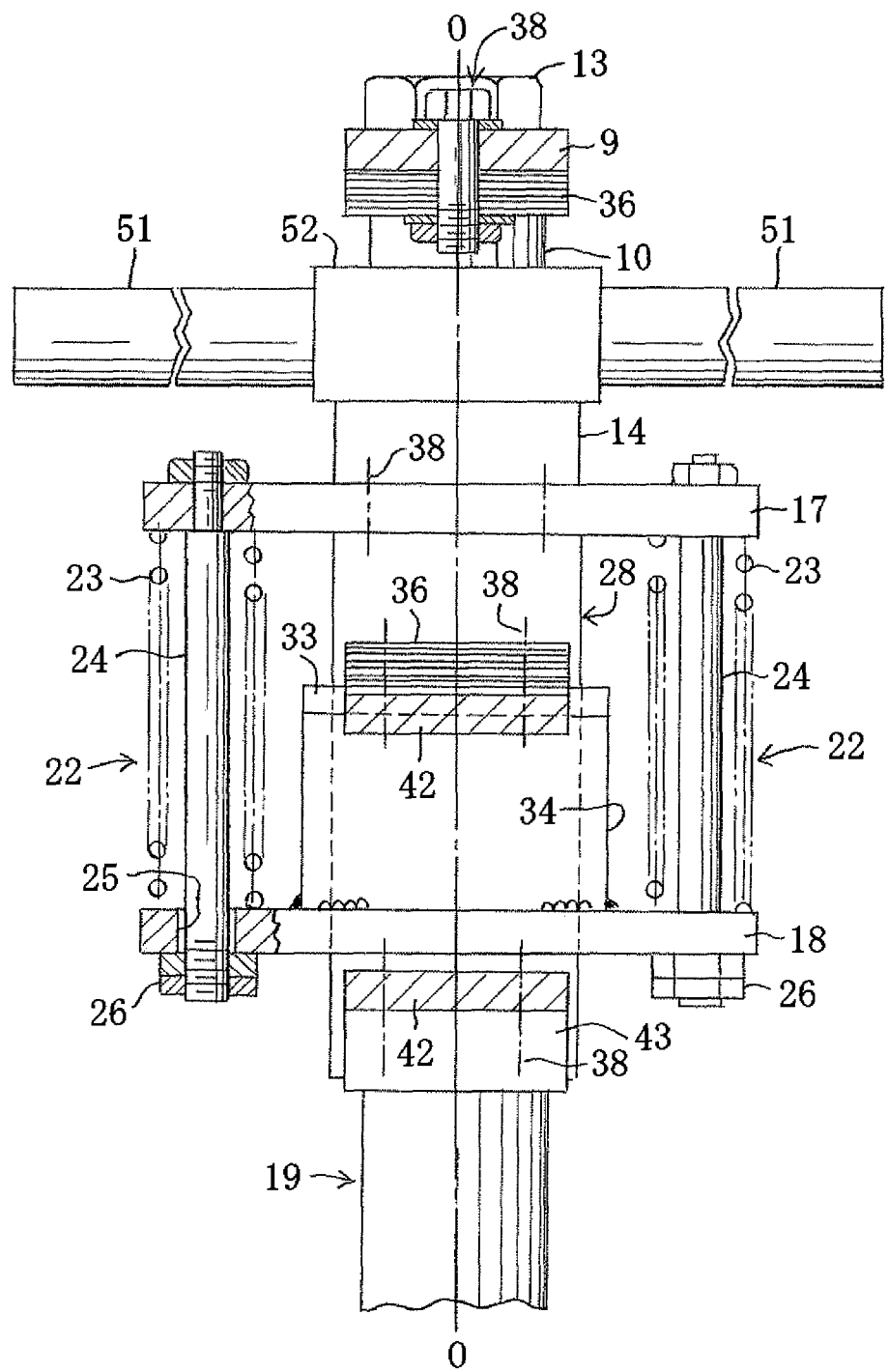
FIG. 2 is a cross-sectional view taken along (2)-(2) in FIG. 1A.

The iron-made projection bolt 1 to be welded in Embodiment 1 includes, as shown in FIG. 1B, a shaft section 2 having a male thread formed thereon, a circular flange 3 formed integrally with the shaft section 2 and having a diameter larger than the diameter of the shaft section 2, and a circular welding projection 4 disposed on the side opposite to the shaft section 2 and located at the center of the flange 3. A tapered section 5 with a small inclination angle θ is formed on the end face of the welding projection 4 such that its thickness decreases toward the outer circumference. An apex 6 is formed at the central portion of the tapered section 5.

The dimensions of each section of the bolt 1 are as follows. The diameter of the shaft section 2 is 7 mm, the diameter of the large-diameter section 3 is 13.5 mm, and the diameter of the welding projection 4 is 10 mm. The thickness of the large-diameter section 3 is 1.1 mm, the overall height of the welding projection 4 is 1.3 mm, and the inclination angle θ of the tapered section 5 is 9 degrees.

The apex 6 is finished, for example, into a sharp shape by machining or into a slightly rounded shape by molding using a die. The current densities of these shapes at the initial stage of energization are substantially the same. The current density when the apex 6 is formed as a small-diameter circular flat portion is also the same. For example, the diameter of the circular flat portion is 0.5 mM.

The structure of the electric resistance welding device will next be described.

A power supply cable 8 extending from a transformer (not shown) is connected to a conductive substrate 9, and a rod-shaped insulating member 10 is secured to the conductive substrate 9 through a thread structure section 11. As shown in FIG. 1A, the thread structure section 11 is of the general type in which a male thread section 12 of the insulating member 10 passes through the conductive substrate 9 and a securing nut 13 is screwed into the female thread section 12. The insulating member 10 is formed of a synthetic resin, and a polyamide resin, for example, is used.

A male thread section 15 formed in the insulating member 10 is screwed into a support block 14 formed from a thick stainless steel plate to integrate the insulating member 10 and the support block 14. A slim strip-shaped pressing member 17 formed from a stainless steel plate is secured to the lower side of the support block 14.

The conductive substrate 9, the insulating member 10, the support block 14, etc. are members that transmit pressing displacement to the pressing member 17 and are used to perform a pressing action. The pressing member 17 is connected to these members for the pressing action. In other words, the pressing member 17 is a member on a pressing side, and the pressing displacement is transmitted thereto through the conductive substrate 9, the insulating member 10, the support block 14, etc.

Figure 4:
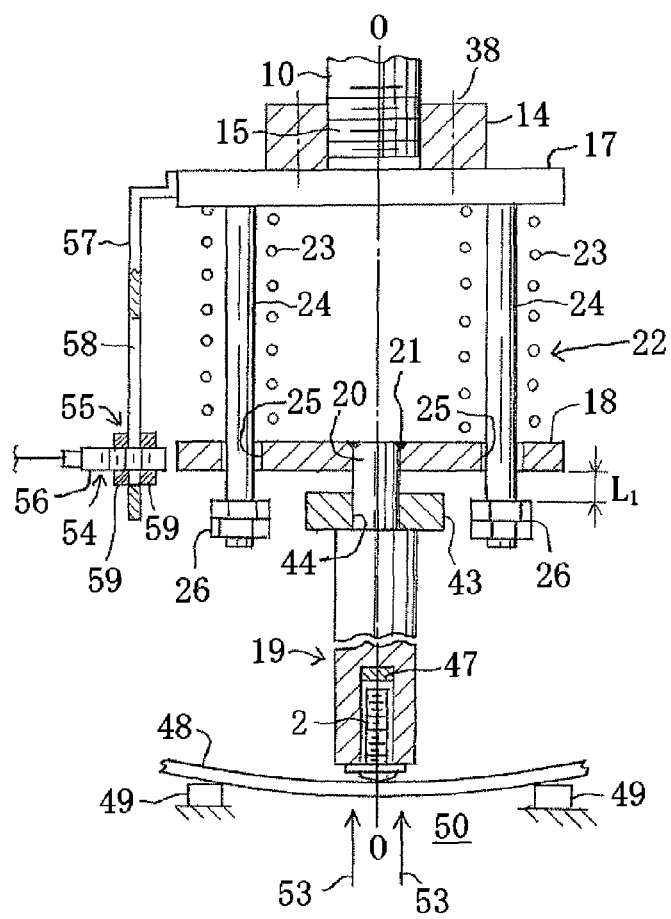
FIG. 4 is a front view illustrating a simplified structure as a whole.

A pressed member 18 is a member pressed by the pressing member 17. The pressed member 18 has the same shape as the shape of the pressing member 17 and is formed of the same material as the material for the pressing member 17, and a pressing electrode 19 is connected to the pressed member 18. As shown in FIGS. 1A and 4, a connection shaft section 20 of the pressing electrode 19 passes through the central portion of the pressed member 18, and the pressing electrode 19 and the pressed member 18 are integrated through a welded portion 21. The pressed member 18 plays a role in transmitting pressing force to the projection bolt (shaft-shaped component) 1 inserted into a receiving hole (described later) of the pressing electrode 19.

FIG. 4 shows a simplified structure for facilitating the understanding.

Symbols O-O represent the axis of the electrode, and the pressing electrode 19 and the insulating member 10 are disposed on the axis.

Pressing force accumulating means will next be described.

The pressing force accumulating means 22 accumulates the pressing force for the pressing electrode 19 that is caused by the pressing displacement of the pressing member 17, and elastic force caused by the pressing displacement is accumulated, whereby the pressing force is applied to the pressing electrode 19. Various structures such as a compression coil spring and an elastic unit using a compressed fluid can be used for the pressing force accumulating means 22.

In this embodiment, two compression coil springs 23 are used. The compression coil springs 23 are disposed between the pressing member 17 and the pressed member 18. Two parallel guide shafts 24 secured to the pressing member 17 pass through the compression coil springs 23. The guide shafts 24 are disposed in parallel to the electrode axis O-O, and the electrode axis O-O passes through a central portion between the guide shafts 24, as is clear from FIGS. 2 and 4.

The lower portions of the guide shafts 24 pass through holes 25 formed in the pressed member 18, and double nuts 26 used as stoppers are attached to the ends of the guide shafts 24. The spacing between the pressing member 17 and the pressed member 18 is set by adjusting the positions of the double nuts 26 so that the tensions of the compression coil springs 23 are received.

A description will next be given of guide means.

Figure 3A:
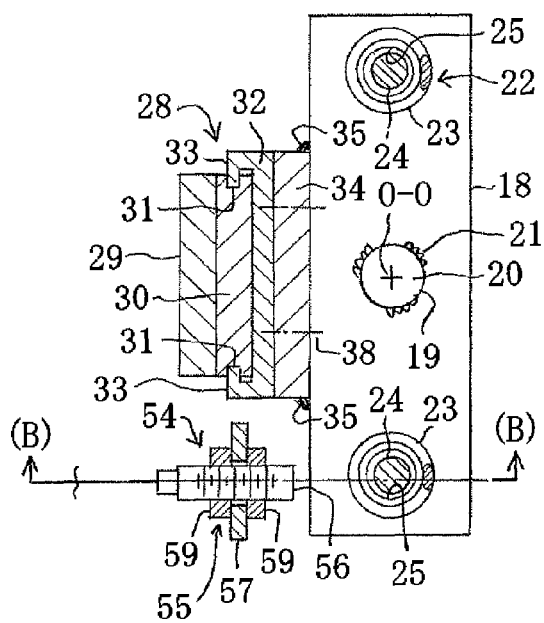
FIG. 3A is a cross-sectional view taken along (3A)-(3A) in FIG. 1A.
Figure 3B:
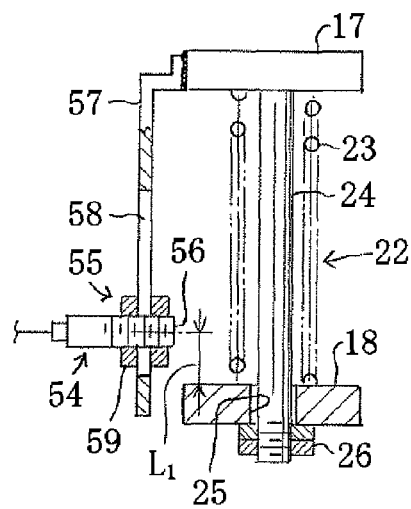
FIG. 3B is a cross-sectional view taken along (B)-(B) in FIG. 3A.

To allow the pressing member 17 and the pressed member 18 to be displaced relative to each other along the electrode axis O-O, guide means 28 is disposed between the pressing member 17 and the pressed member 18. As shown in FIGS. 1A and 3A, a slim support member 29 formed from a stainless steel plate is attached to the support block 14 so as to be parallel to the electrode axis O-O. A guide member 30 is secured to the inner side of the support member 29, and guide grooves 31 parallel to the electrode axis O-O are formed at the opposite ends of the guide member 30. Sliding pieces 33 of a sliding member 32 are fitted into the guide grooves 31. A connection member 34 is secured to the sliding member 32, and the lower portion of the connection member 34 is welded to the pressed member 18. Reference numeral 35 represents the welded portion.

A conductive member will next be described.

To supply welding current from the conductive substrate 9 to the pressing electrode 19, a deflectable conductive member 36 is provided. The conductive member 36 is a stack of a large number of slim and thin copper plates and includes a deflectable curved section 37. One end of the conductive member 36 is connected to the conductive substrate 9 through a bolt connection portion 38. The bolt connection portion 38 is formed by causing a securing bolt 39 to pass through the conductive substrate 9 and the conductive member 36 and tightening a protruding portion of the securing bolt 39 with a securing nut 40.

The other end of the conductive member 36 is connected to a connection member 42 having a square U-shaped cross-section through a structure similar to the structure of the bolt connection portion 38. The connection member 42 is connected to a conductive block 43 through a structure similar to the structure of the bolt connection portion 38. A connection hole 44 is formed in the conductive block 43, and the connection shaft section 20 of the pressing electrode 19 is press-fitted into the connection hole 44.

As is clear from FIG. 1A, the conductive member 36 is disposed on the side opposite to the guide means 28 with the electrode axis O-O therebetween. Therefore, the guide means 28 is disposed on one side of the electrode axis O-O, and the conductive member 36 is disposed on the other side of the electrode axis O-O.

The use of the connection member 42 allows the length of the conductive member 36 to be reduced. In addition, the length of the curved section 37 that extends to the right in FIG. 1A can be reduced, so that a compact structure can be obtained.

In each of the figures, portions indicated by alternate long and short dashed lines in connection portions are denoted by reference numeral 38, and structures similar to the structure of the bolt connection portion 38 are used for such portions. In some structures, the securing bolt 39 is firmly screwed without using the securing nut 40.

A description will next be given of the pressing electrode.

An electrode main body 45 is connected to the front end side of the pressing electrode 19, and a receiving hole 46 coaxial with the electrode axis O-O is formed in the central portion of the end face of electrode main body 45. A permanent magnet 47 is inserted into the receiving hole 46, and the bolt 1 inserted into the receiving hole 46 is attracted by the permanent magnet 47 and thereby prevented from falling off.

A description will next be given of the form of a steel plate component.

The steel plate component 48 has a flat shape and is placed on support jigs 49. The bolt 1 is to be welded to one side of the steel plate component 48, and the other side opposite to the one side is exposed to open space 50. By advancing the pressing electrode 19, the welding projection 4 of the bolt 1 is pressed against only the one side of the steel plate component 48 to perform the electric resistance welding of the bolt 1. The thickness of the steel plate component 48 is 0.7 mm.

A description will next be given of a handle.

The electric resistance welding device in Embodiment 1 is used when the bolt 1 is electric-resistance-welded to the one side of the steel plate component 48 with the other side being exposed to the open space 50. A handle 51 is provided to allow the operator to use the welding device as a portable hand-held type device. As is clear from chain double-dashed lines in FIG. 1A and from FIG. 2, the insulating member 10 passes through a fixed block 52 to integrate them, and the rod-shaped handle 51 is disposed in the fixed block 52. The welding device can be attached to a robot device (not shown) and then operated.

When the operator holds the handle 51 and moves the entire welding device toward the steel plate component 48, the welding projection 4 of the bolt 1 supported by the electrode main body 45 is pressed against the steel plate component 48. This pressing operation causes the guide shafts 24 to pass through the through holes 25, resulting in a reduction in the distance between the pressing member 17 and the pressed member 18, as shown in FIG. 4. The compression coil springs 23 are thereby compressed between the pressing member 17 and the pressed member 18, and pressing force is accumulated in the compression coil springs 23 serving as the pressing force accumulating means. The pressing causes the steel plate component 48 to be elastically deformed toward the open space 50. The elastic deformation generates elastic restoring force 53. The amount of the elastic deformation shown in FIG. 4 is exaggerated for ease of understanding.

In the above action, the welding pressing force of the welding projection 4 against the steel plate component 48 is the sum of the pressing force accumulated in the compression coil springs 23 serving as the pressing force accumulating means and the elastic restoring force 53 of the steel plate component 48 elastically deformed by the advance of the pressing electrode 19. An appropriate value of the resultant welding pressing force is set according to the thickness of the steel plate component 48 and the size and shape of the welding projection 4. Therefore, the welding current must be applied when the compressed length of the compression coil springs 23 becomes a predetermined length. For this purpose, sensor means described below is provided.

A description will next be given of the sensor means.

As shown in FIG. 4, sensor means 54 is provided. When the pressing member 17 is displaced to a predetermined position and the compression coil springs 23 are compressed to a predetermined length, the sensor means 54 is activated to allow the welding current to be applied to the pressing electrode 19. The activation position of the sensor means 54 is set such that the welding current is applied to the pressing electrode 19 when the welding pressing force becomes an appropriate value. To set the activation position of the sensor means 54 appropriately, pressing force adjusting means 55 is provided.

Various types of means such as optical sensors and electromagnetic sensors can be used as the sensor means 54. In Embodiment 1, the sensor means 54 is of the electromagnetic type. An activation signal is issued when the pressed member 18 used as a member to be detected passes through a magnetic field generated from the sensing surface of a sensor 56, and this signal is used to apply the welding current.

The pressing force adjusting means 55 for adjusting the activation position of the sensor 56 is formed by using an elongated hole for adjustment and a securing nut. A slim plate member 57 is secured to the pressing member 17, and an elongated hole 58 is formed in the plate member 57 so as to be parallel to the electrode axis O-O. The sensor 56 is inserted into the elongated hole 58, and a securing nut 59 is screwed onto the male thread of the sensor 56 to tighten the sensor 56 to the plate member 57. The position of the sensor 56 is adjusted along the elongated hole 58.

The welding pressing force varies depending on the thickness of the steel plate component 48, the size of the welding projection 4, etc. Therefore, the relation of the thickness of the steel plate component 48, the size of the welding projection 4, etc. to a pressing length $L_1$ (see FIG. 4) has been stored as a correlation table. The pressing length $L_1$ read from the correlation table is set using the pressing force adjusting means 55. The pressing length $L_1$ is reset each time a steel plate component 48 having a different thickness, a welding projection 4 having a different size, etc. are used. In this manner, the welding current is applied when an appropriate welding pressing force is reached.

As described above, the sensor means 54 is detection means that is activated when the amount of the pressing displacement of the pressing force accumulating means 22 reaches a predetermined value and the pressing force of the welding projection 4 against the steel plate component 48 is set to a predetermined value. The detection signal from the detection means, i.e., the sensor means 54, is used to apply the welding current.

A description will next be given of welding conditions.

The welding pressing force of the welding projection 4 against the steel plate component 48 is 1,960 N. The current value of the welding current is 9,000 A, and the weld time is 6 cycles (one cycle is 1/60 seconds).

The bolt 1 welded under the above conditions was subjected to a tensile test with the steel plate component 48 being fixed. The result showed that the steel plate component 48 ruptured circularly at 3,185 N. More specifically, the welded portion itself did not rupture, but rupture occurred on the steel plate component 48. It can be determined from this rupture state that the welding strength of the welded portion is significantly high. The value of 3,185 N is sufficient for, for example, attaching the heat exchanger of an air conditioner to the dash panel of an automobile.

The action of applying the welding current in response to the signal from the sensor 56 can be easily achieved by a commonly used control method. A prescribed energization action can be ensured by using switch means that operates when the signal from the sensor 56 is inputted to a control unit or a sequence circuit.

The steel plate component 48 in the above embodiment is a flat plate-shaped member. However, the bolt 1 may be welded to the surface of a hollow closed cross-sectional structure portion, such as a pillar structure portion, of the body of an automobile. In such a case, the internal space of the closed cross-sectional structure portion forms the open space 50.

The operational effects of Embodiment 1 described above are as follows.

The welding pressing force of the welding projection 4 against the steel plate component 48 when the pressing member 17 is displaced to a predetermined position is given as the sum of the pressing force accumulated in the compression coil springs 23 used as the pressing force accumulating means and the elastic restoring force 53 of the steel plate component 48 elastically deformed by the advance of the pressing electrode 19. When the sum reaches a predetermined value, the welding current is applied. More specifically, an appropriate welding pressing force is set according to the predetermined displacement amount of the pressing member 17, and the welding current must be applied when the appropriate welding pressing force is reached. Energization timing suitable for the predetermined welding pressing force is set by the pressing force adjusting means 55 using its function of adjusting the activation position of the sensor means 54. Therefore, the welding current is applied under appropriate welding pressing force conditions, and a favorable welded portion can thereby be ensured.

The elastic restoring force 53 of a steel plate component 48 may change depending on its thickness, and the heat capacity of the welding projection 4 of a bolt 1 may change depending on the size and shape of the welding projection 4. In such cases, the welding pressing force of the welding projection 4 against the steel plate component 48 must be set to a suitable value according to such changes, and the welding current must be applied when the set value is reached. The function of adjusting the activation position of the sensor means 54 that is performed by the pressing force adjusting means 55 is used to cope with the changes. For example, when a steel plate component 48 having a large thickness is used and the welding projection of a projection nut is used instead of the welding projection of a projection bolt, the activation position of the sensor means 54 is adjusted so that the welding current is applied when an appropriate welding pressing force is reached. In this manner, regular welded portions can be always ensured even when various changes such as described above are faced.

Particularly, for a hand-held welding device in which the welding pressing force is set depending on the force of the operator, the adjustment according to various changes can avoid the occurrence of unusual unevenness in welding pressing force, and the occurrence of defective welding can thereby be prevented.

The guide means 28 for allowing the pressing member 17 and the pressed member 18 to be displaced relative to each other along the electrode axis O-O is disposed between the pressing member 17 and the pressed member 18. The guide means 28 is attached to the support member 29 disposed in parallel to the axis direction O-O of the pressing electrode 19.

With this configuration, the pressing member 17 and the pressed member 18 are displaced relative to each other in the direction O-O along the axis direction of the pressing electrode 19, and therefore the displacement movement of the pressing member 17 and the pressed member 18 is performed smoothly and accurately.

The deflectable conductive member 36 for supplying the welding current to the pressing electrode 19 is disposed on the side opposite to the guide means 28 with respect to the axis O-O of the pressing electrode 19.

In this configuration, the conductive member 36 and the guide means 28 can be disposed on the opposite sides of the axis O-O of the pressing electrode 19, and the device can be made compact as a whole.

In this configuration, two compression coil springs 23 serving as the pressing force accumulating means are disposed in parallel to each other, and the axis O-O of the pressing electrode 19 passes between the two pressing force accumulating means 23.

The two compression coil springs 23 disposed in this configuration can improve the support stability of the pressing member 17 and the pressed member 18. Since the axis O-O of the pressing electrode 19 passes between the compression coil springs 23, the structural compactness in the vicinity of the pressing force accumulating means is improved.

The pressing force accumulating means is formed as the compression coil springs 23.

With the above configuration, the pressing force is accumulated in a reliable manner, and the structure is simplified.

[Embodiment 2]

Figure 5:
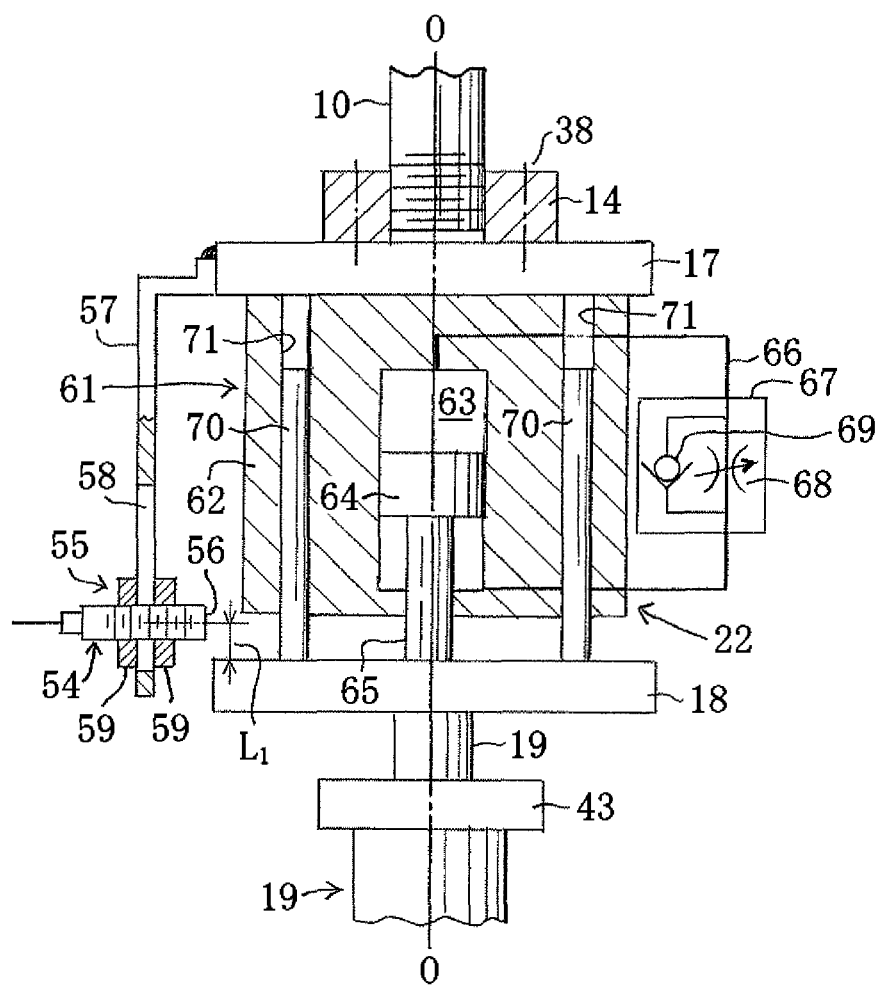
FIG. 5 is a front view illustrating another modification.

FIG. 5 shows Embodiment 2 of the present invention.

In Embodiment 2, the pressing force accumulating means 22 is formed as a fluid-type pressure accumulation unit. The fluid-type pressure accumulation unit 61 is disposed between the pressing member 17 and the pressed member 18. The fluid in the fluid-type pressure accumulation unit 61 is compressible air. A cylinder body 62 is secured to the pressing member 17, and a piston 64 is inserted into a cylinder 63 formed in the cylinder body 62. A piston rod 65 of the piston 64 protrudes from the cylinder body 62 and is connected to the pressed member 18. The piston 64 is configured to advance and retract in the same direction as the direction of the electrode axis O-O.

Cylinder spaces above and below the piston 64 are in communication with each other through a passage 66, and a control valve 67 is disposed in the passage 66. In the control valve 67, a throttle valve 68 for imparting throttle resistance to an air flow from the upper cylinder space to the lower cylinder space is inserted, and a check valve 69 is inserted on the reverse side. Guide rods 70 secured to the pressed member 18 are inserted advanceable and retractable to guide holes 71 of the cylinder body 62 to smoothen the advancing and retracting movement. The rest of the configuration, including portions not shown, is the same as that in Embodiment 1, and components having similar functions are denoted by the same reference numerals.

When the pressing electrode 19 is advanced and the welding projection 4 of the bolt 1 is pressed against the steel plate component 48, air is squeezed from the upper cylinder space to the lower cylinder space. Therefore, the compressed air is stored in the upper cylinder space, and the pressing force is thereby accumulated.

Since the pressing force accumulating means 22 is configured as the fluid-type pressure accumulation unit 61, the pressing force can be accumulated in a reliable manner, and the structure can be simplified. The other operational effects are the same as those in Embodiment 1 described above.

[Embodiment 3]

FIGS. 6A, 6B, 7, 8A, 8B, and 9 show Embodiment 3 of the present invention.

In Embodiments 1 and 2 described above, the electric resistance welding devices are configured such that the shaft-shaped component is pressed against the steel plate component and the welding current is applied when a predetermined pressing force is reached. However, in Embodiment 3, such an operational function is implemented as an electrode structure.

The shaft-shaped component to be welded is a projection bolt 1 similar to those in the embodiments described above, but the dimensions of respective sections are slightly different from those in the above embodiments. The diameter of the shaft section 2 is 6 mm, the length of the shaft section 2 is 27 mm, and the diameter of the flange 3 is 14 mm.

A description will next be given of the structure of the electrode.

The entire electrode is denoted by reference numeral 105. An electrode main body 106 is similar to the electrode main body 45 in Embodiment 1 and is a cylindrical member made of a copper alloy material such as chromium-copper. The electrode main body 106 includes a first member 108 secured to an attachment member 107, a second member 110 connected to the first member 108 through a thread section 109, and an end member 112 connected to the end of the second member 110 through a thread section 111. The end face of the end member 112 serves as a flat electrode end face 113 that comes into intimate contact with the flange 3. The electrode main body 106 configured as above corresponds to the pressing member 17 in Embodiment 1.

A guide tube 114 made of an insulating synthetic resin material such as a urethane or polyamide resin is inserted into the second member 110, and a large-diameter hole 115 and a small-diameter hole 116 in communication therewith are formed inside the guide tube 114. A receiving hole 117 into which the shaft section 2 is to be inserted is provided in the end member 112. One end of the receiving hole 117 is in communication with the small-diameter hole 116 of the guide tube 114, and the other end is located at the electrode end face 113. The central axis of the receiving hole 117 is coaxial with the central axis of the electrode main body 106.

An insulating structure is formed on the inner surface of the receiving hole 117. The insulating structure is formed from an insulating tube 118 fitted into the end member 112 and a gap 119. The inner diameter of the insulating tube 118 is set to be slightly larger than the outer shape of the shaft section 2, and the inner diameter of the receiving hole 117 at the gap 119 is set to be sufficiently larger than the outer shape of the shaft section 2. By setting the dimensions as described above, even when the shaft section 2 is inclined, the inclination angle is very small, so that the shaft section 2 is prevented from coming into contact with the inner surface at the gap 119. In this configuration, the gap 119 forms part of the insulating structure. The inner diameter of the insulating tube 118 is equal to the inner diameter of the small-diameter hole 116.

A stopper member 121 that receives the shaft section 2 inserted into the receiving hole 117 is disposed in the guide tube 114 so as to be advanceable and retractable. The advanceable and retractable stopper member 121 disposed corresponds to "the structure in which the guide shafts 24 secured to the pressing member 17 pass through the through holes 25 formed in the pressed member 18" in Embodiment 1 and to "the structure in which the guide rods 70 secured to the pressed member 18 advance and retract inside the guide holes 71 in the cylinder body 62 secured to the pressing member 17" in Embodiment 2. The stopper member 121 includes a cylindrical main member 122 that slides on the inner surface of the large-diameter hole 115 and a sub-member 123 that has been advanced into the small-diameter hole 116 and receives the end of the shaft section 2. To embed a permanent magnet 124 serving as attracting means in the main member 122, the main member 122 is divided into two parts, and these two parts are integrated at a welded portion 125.

An insulating cup 126 made of an insulating synthetic resin material such as a urethane or polyamide resin is inserted into the first member 108 with the opening of the cup being directed downward, and a terminal plate 127 made of a copper alloy is disposed on the bottom of the cup. A compression coil spring 128 serving as urging means is inserted between the terminal plate 127 and the stopper member 121, and the tension of the spring 128 is received by allowing the main member 122 to abut against a stopper surface 129 formed at a boundary portion between the large-diameter hole 115 and the small-diameter hole 116.

The compression coil spring 128 serving as the urging means corresponds to the pressing force accumulating means 22 in Embodiment 1 described above. The pressing displacement of the electrode main body 106 serving as a pressing member is transmitted to the stopper member 121 through the compression coil spring 128. Therefore, the stopper member 121 corresponds to the pressed member 18 in Embodiment 1.

When the main member 122 is in intimate contact with the stopper surface 129 as described above, the attracting force of the permanent magnet 124 is acting on the shaft section 2, and therefore the end portion of the shaft section 2 is attached to the end face of the sub member 123. In this state, a gap $L_2$ is formed between the electrode end face 113 and the flange 3. The attracting force of the permanent magnet 124 prevents the bolt 1 from falling off the receiving hole 117.

Figure 7:
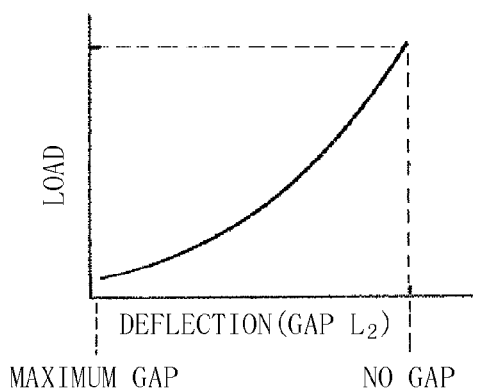
FIG. 7 shows a load-deflection curve representing the pressing force of the electrode.

When the electrode 105 is advanced and the welding projection 4 is pressed against a welding object member 131 (a steel plate component 131), the gap $L_2$ is reduced, and the compression coil spring 128 is compressed. Therefore, the pressing force of the welding projection 4 against the welding object member 131 increases. The pressing force is maximized when the gap $L_2$ becomes zero. The spring constant of the compression coil spring 128 and the gap $L_2$ are set such that the maximum value of the pressing force gives an appropriate pressing force. In the figures, the gap $L_2$ is 6 mm. The maximum pressing force is set in the range of 100 N to 250 N when the bolt 1 having the dimensions described above is welded to the steel plate component 131 (welding object member 131) having a thickness of 0.7 mm. In this embodiment, the maximum pressing force is 200 N. The welding current is 9,500 A, and the weld time is 6 cycles (one cycle=1/60 seconds). The load-deflection curve of the compression coil spring 128 is shown in FIG. 7. The welding object member 131 is placed in position on support jigs 132.

The compression coil spring 128 is used as the urging means. However, instead of the compression coil spring 128, the pressure of compressed air can be allowed to act on the upper surface of the stopper member 121 to function as an air spring.

A description will next be given of the control of the application of the welding current.

Figure 6A:
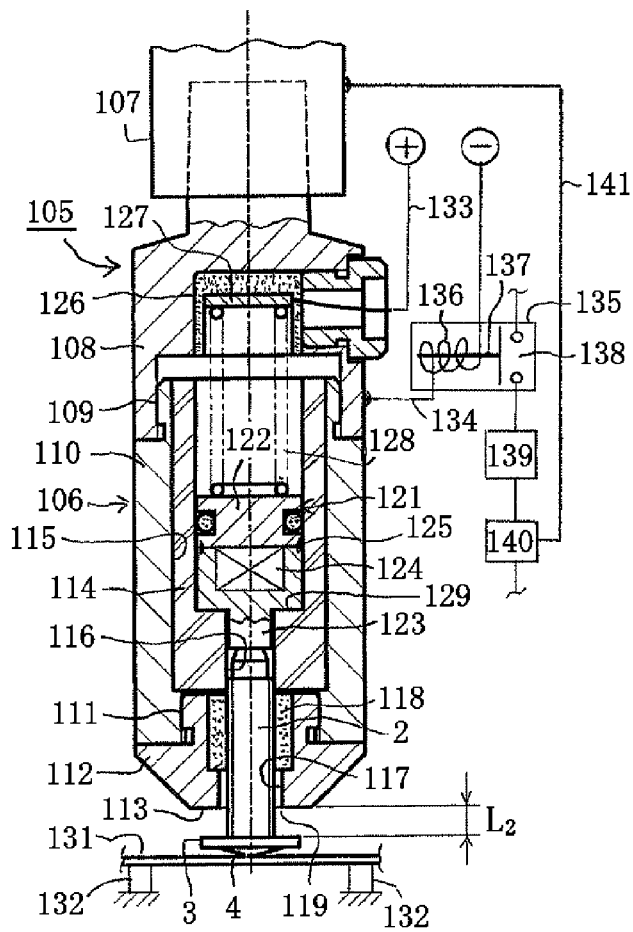
FIG. 6A is a cross-sectional view of an electrode before application of pressure.
Figure 6B:
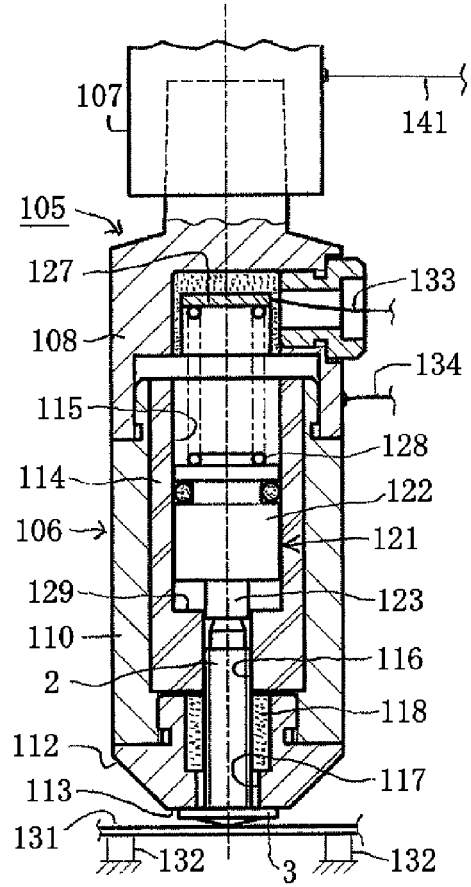
FIG. 6B is a cross-sectional view of the electrode after application of pressure.

The terminal plate 127 is connected to the positive side of a power source for a detection current through a conduction line 133, and the detection current flows through the terminal plate 127, the compression coil spring 128, the stopper member 121, the shaft section 2, the flange 3, the electrode end face 113, and the electrode main body 106 to a negative-side conduction line 134 connected to the first member 108, as shown in FIG. 6B.

The above-described energization is established when the electrode end face 113 comes into contact with the flange 3. This intimate contact is formed when the electrode 105 is advanced to compress the compression coil spring 128 and the pressing force of the welding projection 4 against the steel plate component 131 reaches a predetermined value. The intimate contact between the electrode end face 113 and the flange 3 corresponds to the closing of the switching contact of a switch. This is used as detection means activated when the pressing displacement amount $L_2$ of the compression coil spring 128 reaches a predetermined value and the pressing force of the welding projection 4 against the steel plate component 131 is set to a predetermined value. A detection signal from the detection means is used as a trigger signal, and the welding current is applied as described below.

The detection current, i.e., the detection signal, is used as the trigger signal for applying the welding current between the welding projection 4 and the steel plate component 131. Various circuit configurations can be used for a circuit for using the detection signal as the trigger signal. In this embodiment, a relay switch 135 that is activated when the detection signal flows is used. The relay switch 135 is of the general type and is a combination of a coil 136, a movable iron core 137, and a switching contact 138.

Reference numeral 139 represents a control unit comprising a sequence circuit or a computer device. When the switching contact 138 is closed, the activation signal is inputted to the control unit 139, and a welding command signal in response to the input signal is sent from the control unit 139 to a welding current transformer 140. The welding current having the above-described current value is allowed to flow from a conduction line 141 to the attachment member 107, and the welding projection 4 is welded to the steel plate component 131. The weld time (six cycles) is set by a timer device provided in the control unit 139.

As shown in FIG. 6B, when the electrode end face 113 comes into intimate contact with the flange 3, the detection current, i.e., the detection signal, flows from the conduction line 133 to the conduction line 134. This allows the verification of the normal insertion state of the bolt 1 into the receiving hole 117. If, for some reason, the bolt 1 is not inserted into the receiving hole 117, no energization signal flows from the conduction line 133 to the conduction line 134 even when the electrode end face 113 is in contact with the steel plate component 131. When this phenomenon in which no signal flows is detected, it is verified that the bolt 1 is absent. To check that no energization signal is flowing, a signal indicating that a predetermined time has elapsed after the advance of the electrode 105 and the status indicating that no energization signal flows from the conduction line 133 to the conduction line 134 are subjected to AND processing. When the AND condition is met, warning means (not shown) such as a warning lamp or a warning buzzer is activated.

Figure 9:
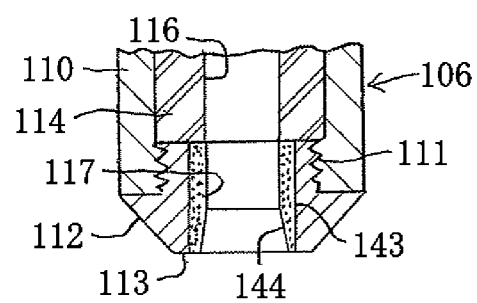
FIG. 9 is a cross-sectional view illustrating an insulating structure.

FIG. 9 shows another insulating structure on the inner surface of the receiving hole 117. In this insulating structure, the receiving hole 117 is formed by inserting an insulating tube 143 made of an insulating synthetic resin material such as a urethane or polyamide resin into the end member 112. The opening side of the receiving hole 117 is formed as a tapered hole 144 so that the shaft section 2 can be inserted smoothly without being stuck. Alternatively, an insulating material such as a ceramic material may be thermal sprayed onto the metal inner surface of the receiving hole 117 formed in the end member 112.

Figure 8A:
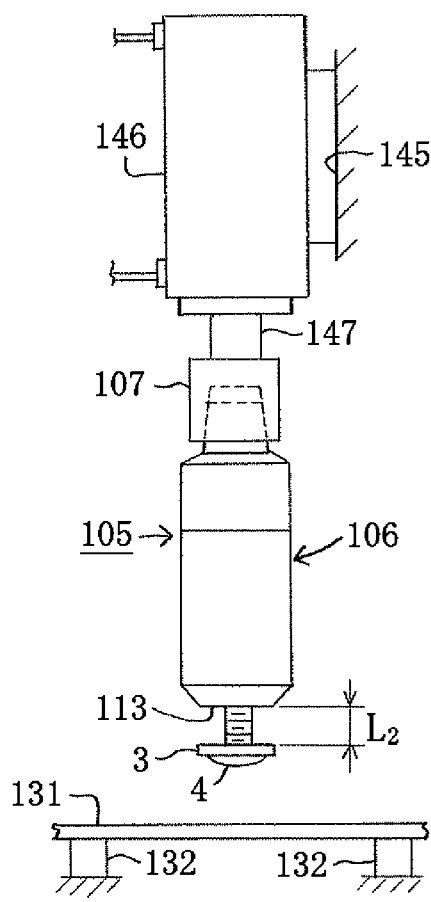
FIG. 8A is a side view illustrating an example of the practical use of the electrode.
Figure 8B:
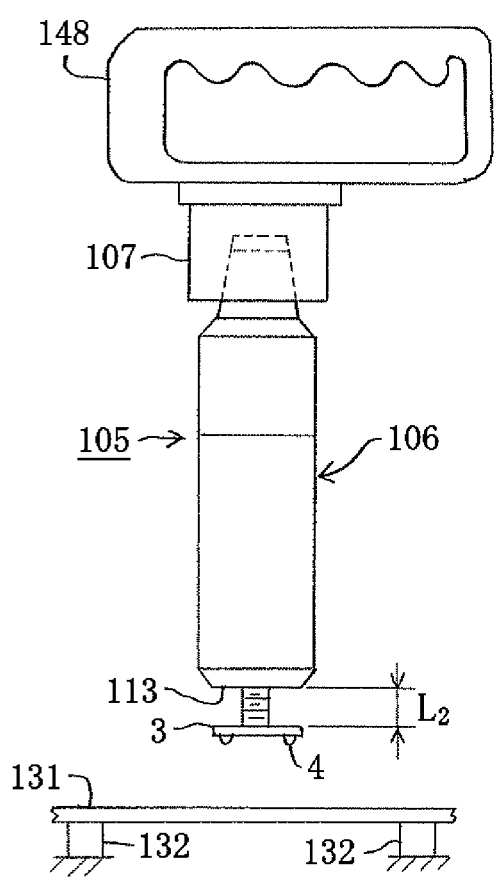
FIG. 8B is a side view illustrating another example of the practical use of the electrode.

FIGS. 8A and 8B show examples of the electrode 105 in practical use. In FIG. 8A, an air cylinder 146 is secured to a stationary member 145, and the attachment member 107 is connected to a piston rod 147 of the air cylinder 146. The rest of the configuration, including portions not shown, is the same as that in the example shown in FIGS. 6A and 6B, and components having similar functions are denoted by the same reference numerals. The device shown in FIG. 8B is a portable electric resistance welding device. The attachment member 107 is secured to a handle 148 to be held by the operator. The rest of the configuration, including portions not shown, is the same as that in the above example, and components having similar functions are denoted by the same reference numerals.

Instead of the air cylinder 146, an electric motor outputting advance-retract movement may be used.

The operational effects of Embodiment 3 described above are as follows.

Since the insulating structure is formed on the inner surface of the receiving hole 117 and the stopper member 121 is inserted into the guide tube 114 made of an insulating material, the shaft section 2 of the bolt 1 does not come into contact with any portion of the metal-made electrode main body 106. Therefore, when the electrode 105 is advanced and the welding projection 4 is pressed against the steel plate component 131 serving as the welding object member, the electrode end face 113 comes into contact with the flange 3 against the spring force of the compression coil spring 128 serving as the urging means. The energization signal current thereby flows between the electrode end face 113 and the flange 3, and the welding current is applied in response to the flow of the energization signal current used as the trigger signal. The welding is thereby completed.

Therefore, the trigger signal can be ensured by the intimate contact between the electrode end face 113 and the flange 3 without using any special signal generating means, and the electrode 105 obtained can have a simplified structure. The timing of the application of the welding current is set to the timing at which the electrode end face 113 comes into press contact with the flange 3, and the energization timing is always maintained constant, with the welding projection 4 being appropriately pressed against the steel plate component 131. A uniform welding state is thereby formed, and favorable welding quality can be ensured.

The value of the length of the predetermined gap $L_2$ is set so that the predetermined value of the pressing force of the welding projection 4 against the steel plate component 131 is set to a value that corresponds to the compression reaction force of the compression coil spring 128 when the electrode end face 113 comes into contact with the flange 3.

When the separation length being the length $L_2$ of the predetermined gap between the electrode end face 113 and the flange 3 disappears, the amount of compression of the compression coil spring 128 is constant, and therefore the compression reaction force of the compression coil spring 128 is always constant. Therefore, the pressing force of the welding projection 4 against the steel plate component 131 is a constant load determined by the length $L_2$, and the amount of molten metal is constant, so that favorable welding quality can be ensured. Since the length $L_2$ can be appropriately selected by changing the length of the sub-member 123, the pressing force can be simply optimized when a steel plate component 131 having a different thickness or a welding projection 4 having a different size is used.

Particularly, in the portable electric resistance welding device shown in FIG. 8B, since the operator holds the device with the hands during operation, it is difficult to set the pressing force of the welding projection 4 against the steel plate component 131 to a predetermined value. More specifically, since the pressing force varies depending on the operation by the operator, the welded state is not steady, and this is not preferred in terms of the maintenance of welding quality. However, in the present embodiment, since a constant pressing force determined by the length $L_2$ is always applied as described above, the problem of the welding quality is eliminated. In addition, even in the above-described hand-held type device, welding is preformed with the electrode end face 113 being in contact with the flange 3. Therefore, the bolt 1 can be welded perpendicularly to the steel plate component 131 by aligning the electrode axis perpendicular to the steel plate component 131.

In this configuration, the insertion of the bolt 1 into the receiving hole 117 is detected by the energization signal obtained by the contact between the electrode end face 113 and the flange 3.

With this configuration, if, for some reason, the bolt 1 is not held by the electrode 105, the absence of the bolt 1 can be detected before the welding current is applied, and problems caused by a defective product in the subsequent process can be prevented. Since the energization signal obtained by the contact between the electrode end face 113 and the flange 3 can be used as two trigger signals, i.e., the trigger signal for starting the application of the welding current and the signal for detecting the absence of the bolt 1, the circuit configuration, for example, can be simplified.

In an embodiment of a welding method, a bolt 1 including a shaft section 2, a flange 3 formed integrally with the shaft section 2, and a welding projection 4 formed on a flange surface opposite to the shaft section 2 is used for electric resistance welding. The method includes: preparing an electrode 105 having formed therein a receiving hole 117 having an opening on an electrode end face 113, the shaft section 2 being inserted into the receiving hole 117, a predetermined gap $L_2$ being formed between the electrode end face 113 and the flange 3 of the bolt 1 inserted into the receiving hole 117; advancing the electrode 105 and pressing the welding projection 4 against a steel plate component 131 to bring the electrode end face 113 into contact with the flange 3; and applying welding current flowing between the welding projection 4 and the steel plate component 131 using an energization signal obtained by the contact as a trigger signal.

As described above, the welding current is applied when the electrode end face 113 simply comes into contact with the flange 3. Therefore, the trigger signal can be ensured by the intimate contact between the electrode end face 113 and the flange 3 without using any special signal generating means, and the timing of the application of the welding current can be maintained constant. More specifically, the timing of the application of the welding current is set to the timing at which the electrode end face 113 comes into press contact with the flange 3, and the timing of the application of the current is always maintained constant, with the welding projection 4 being appropriately pressed against the steel plate component 131. A uniform welding state is thereby formed, and favorable welding quality can be ensured.

INDUSTRIAL APPLICABILITY

As described above, with the device, electrode, and welding method of the present invention, the welding current is automatically applied when the pressing force of the electrode against the steel plate component becomes a predetermined value, and favorable welding quality is obtained. Therefore, the present invention is applicable to various industrial fields such as automobile body welding processes and sheet metal welding processes for household electrical products.

REFERENCE SIGNS LIST 1 projection bolt
2 shaft section
3 flange
4 welding projection
17 pressing member
18 pressed member
19 pressing electrode
22 pressing force accumulating means
23 compression coil spring
28 guide means
29 support member
36 conductive member
46 receiving hole
48 steel plate component
50 open space
51 handle
53 elastic restoring force
54 sensor means, detection means
55 pressing force adjusting means
56 sensor
61 fluid-type pressure accumulation unit
O-O electrode axis
$L_1$ pressing length
105 electrode
106 electrode main body, pressing member
113 electrode end face
114 guide tube
117 receiving hole
118 insulating tube
119 gap
121 stopper member, pressed member
124 permanent magnet, attracting means
128 compression coil spring, urging means, pressing force accumulating means
$L_2$ gap (pressing length)
131 welding object member
133 conduction line
134 conduction line
135 relay switch
139 control unit
140 welding current transformer
141 conduction line
143 insulating tube
148 handle

The invention claimed is:

1. An electric resistance welding device comprising:
a pressing electrode having a receiving hole for receiving a shaft-shaped component to be welded to a steel plate, the shaft-shaped component including a shaft section to be inserted into the receiving hole, a flange formed integrally with the shaft section, and a welding protrusion formed on a flange surface of the flange opposite to the shaft section, wherein the pressing electrode is configured to advance toward the steel plate so that the welding protrusion of the shaft-shaped component received in the receiving hole is pressed against the steel plate;
a welding current supply for supplying a welding current to the pressing electrode;
a pressed member that transmits a pressing force to the shaft-shaped component received in the receiving hole of the pressing electrode;

a pressing member configured to displace with a pressing displacement with respect to the pressed member;

a pressing force accumulating means that is disposed between the pressing member and the pressed member, the pressing force accumulating means being configured to displace with a pressing displacement corresponding to the pressing displacement of the pressing member to accumulate the pressing force; and a detecting means configured to activate, when an amount of the pressing displacement of the pressing force accumulating means reaches a predetermined value so that the pressing force to the shaft-shaped component against the steel plate is set to a predetermined value, to output a detection signal to the welding current supply for supplying the welding current to the pressing electrode.

2. The electric resistance welding device according to claim 1, wherein the detecting means is a sensor that activates when the pressing member is displaced to a predetermined position, and wherein the electric resistance welding device further comprises a pressing force adjusting means configured to adjust an activation position of the sensor in order to set the pressing force to the shaft-shaped component to an appropriate value.

3. The electric resistance welding device according to claim 1, further comprising a guide means configured to guide the pressing displacement of the pressing member with respect to the pressed member.

4. The electric resistance welding device according to claim 1, wherein the pressing force accumulating means comprises a compression coil spring.

5. The electric resistance welding device according to claim 1, wherein the pressing force accumulating means comprises a fluid-based pressure accumulation unit.

6. The electric resistance welding device according to claim 2, further comprising a guide means configured to guide the pressing displacement of the pressing member with respect to the pressed member.

7. The electric resistance welding device according to claim 2, wherein the pressing force accumulating means comprises a compression coil spring.

8. The electric resistance welding device according to claim 3, wherein the pressing force accumulating means comprises a compression coil spring.

9. The electric resistance welding device according to claim 6, wherein the pressing force accumulating means comprises a compression coil spring.

10. The electric resistance welding device according to claim 2, wherein the pressing force accumulating means comprises a fluid-based pressure accumulation unit.

11. The electric resistance welding device according to claim 3, wherein the pressing force accumulating means comprises a fluid-based pressure accumulation unit.

12. The electric resistance welding device according to claim 6, wherein the pressing force accumulating means comprises a fluid-based pressure accumulation unit.

13. The electric resistance welding device according to claim 1, wherein the steel plate has one side to which the shaft-shaped component is to be welded and another side which is supported by support jigs in a state of the other side being exposed to open space, and wherein the welding protrusion of the shaft-shaped component is pressed against the one side of the steel plate with a sum of the pressing force accumulated in the pressing force accumulating means and an elastic restoring force of the steel plate elastically deformed by the pressing electrode.

14. The electric resistance welding device according to claim 2, wherein the steel plate has one side to which the shaft-shaped component is to be welded and another side which is supported by support jigs in a state of the other side being exposed to open space, and wherein the welding protrusion of the shaft-shaped component is pressed against the one side of the steel plate with a sum of the pressing force accumulated in the pressing force accumulating means and an elastic restoring force of the steel plate elastically deformed by the pressing electrode.

* * * * *